US011504607B2

(12) United States Patent
Weitzman (10) Patent No.: US 11,504,607 B2
(45) Date of Patent: Nov. 22, 2022

(54) SYSTEM AND METHOD FOR USING A CAMERA UNIT FOR THE POOL CLEANING ROBOT FOR SAFETY MONITORING AND AUGMENTED REALITY GAMES

(71) Applicant: Deep Innovations Ltd, London (GB)

(72) Inventor: Samuel Weitzman, London (GB)

(73) Assignee: Deep Innovations Ltd., London (GB)

( * ) Notice: Subject to any disclaimer, the term of this patent is extended or adjusted under 35 U.S.C. 154(b) by 385 days.

(21) Appl. No.: 16/782,581

(22) Filed: Feb. 5, 2020

(65) Prior Publication Data

US 2020/0246690 A1 Aug. 6, 2020

Related U.S. Application Data

(60) Provisional application No. 62/801,634, filed on Feb. 5, 2019.

(51) Int. Cl.
*A63F 13/213* (2014.01)
*G06N 3/00* (2006.01)
(Continued)

(52) U.S. Cl.
CPC .......... *A63F 13/213* (2014.09); *A63F 13/655* (2014.09); *E04H 4/1654* (2013.01);
(Continued)

(58) Field of Classification Search
CPC .................. A63F 13/213; A63F 13/655; A63F 2300/8082; A63F 13/35; A63F 13/65;
(Continued)

(56) References Cited

U.S. PATENT DOCUMENTS 6,842,674 B2 1/2005 Solomon
7,343,222 B2 3/2008 Solomon
(Continued)

FOREIGN PATENT DOCUMENTS

CN 101661804 A 3/2010
CN 207829045 U 9/2018
(Continued)

*Primary Examiner* — Ping Y Hsieh
*Assistant Examiner* — Daniella M. DiGuglielmo
(74) *Attorney, Agent, or Firm* — Karthik Murthy; Murthy Patent Law PLLC (57) ABSTRACT

A detection and tracking system and method using a camera unit on a robot, or alternatively a camera mounted inside the pool overlooking the bottom of the pool, for safety monitoring for use in and around water-related environments. The robot is able to propel itself and move throughout the body of water, both on the surface and underwater, and the camera unit functions both on the surface and underwater. The robot optimizes the cleaning cycle of the body of water utilizing deep learning techniques. The robot has localization sensors and software that allow the robot to be aware of the robot's position in the pool. The camera is able to send its video feed live over the internet, the processing is performed in the cloud, and the robot sends and receives data from the cloud. The processing utilizes deep learning algorithms, including artificial neural networks, that perform video analytics.

20 Claims, 6 Drawing Sheets

(51) Int. Cl.
*G06N 3/08* (2006.01)
*G06N 3/04* (2006.01)
*G06F 16/51* (2019.01)
*A63F 13/655* (2014.01)
*G05D 1/02* (2020.01)
*E04H 4/16* (2006.01)
*G05B 19/406* (2006.01)
*G06V 40/16* (2022.01)
*G08B 21/08* (2006.01)

(52) U.S. Cl.
CPC ......... *G05B 19/406* (2013.01); *G05D 1/0206* (2013.01); *G06F 16/51* (2019.01); *G06N 3/008* (2013.01); *G06N 3/0454* (2013.01); *G06N 3/08* (2013.01); *G06V 40/16* (2022.01); *G08B 21/08* (2013.01); *A63F 2300/8082* (2013.01); *G05B 2219/39444* (2013.01); *G05B 2219/50193* (2013.01)

(58) Field of Classification Search
CPC ...... A63F 13/67; A63F 13/816; E04H 4/1654; E04H 4/06; G05B 19/406; G05B 2219/39444; G05B 2219/50193; G05D 1/0206; G06F 16/51; G06N 3/008; G06N 3/0454; G06N 3/08; G06V 40/16; G08B 21/08

See application file for complete search history.

(56) References Cited

U.S. PATENT DOCUMENTS

| | | |
|---|---|---|
| 8,380,652 B1 | 2/2013 | Francis, Jr. |
| 9,388,595 B2 | 7/2016 | Durvasula et al. |
| 10,942,990 B2 * | 3/2021 | Bennett ............... H04W 12/084 |
| 2017/0212523 A1 | 7/2017 | Witelson |
| 2018/0073265 A1 * | 3/2018 | Goldenberg ......... G05D 1/0027 |
| 2018/0266134 A1 * | 9/2018 | Pichon ................. G05D 1/0206 |

FOREIGN PATENT DOCUMENTS

| | | |
|---|---|---|
| FR | 2993298 A1 | 1/2014 |
| KR | 101922003 B1 | 11/2018 |

* cited by examiner

SYSTEM AND METHOD FOR USING A CAMERA UNIT FOR THE POOL CLEANING ROBOT FOR SAFETY MONITORING AND AUGMENTED REALITY GAMES

CROSS-REFERENCE TO RELATED APPLICATION

This application claims priority from provisional U.S. patent application Ser. No. 62/801,634, filed Feb. 5, 2019. The disclosure of which is hereby incorporated by reference herein in its entirety.

BACKGROUND

The background description includes information that may be useful in understanding the present invention. It is not an admission that any of the information provided herein is prior art or relevant to the presently claimed invention, or that any publication specifically or implicitly referenced is prior art.

Currently there are pool cleaning devices that go around a pool and clean autonomously.

There are also augmented reality games in which users can see images that are not in fact present through augmented reality glasses, and play games designed with these images in mind.

All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

The following description includes information that may be useful in understanding the present invention. It is not an admission that any of the information provided herein is prior art or relevant to the presently claimed invention, or that any publication specifically or implicitly referenced is prior art.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment.

In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable.

The numerical values presented in some embodiments of the invention may contain certain errors necessarily resulting from the standard deviation found in their respective testing measurements.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

As used in the description herein and throughout the claims that follow, the meaning of "a," "an" and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "Such as') provided with respect to certain embodiments herein is intended merely to better illuminate the invention and does not pose a limitation on the scope of the invention otherwise claimed.

No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY

The present invention is a system and method for using the camera unit for the pool cleaning robot for safety monitoring and augmented reality games, and has the following capabilities:
1. Enhance safety—by identifying and tracking persons
2. Navigation based on the image data that is received through the camera
3. Navigate using deep learning algorithms to optimize the cleaning cycle
4. Use of the video camera and the platform for augmented reality games
5. Be used as a game platform—use the camera on board the robot to facilitate augmented reality games The present invention provides video analytics software that analyzes real-time video feed from a video camera unit to actively monitor and primarily reduce drowning events. The present invention can automatically detect, track and distinguish between an adult, child, toddler, or the family dog. The advanced analytics allow for the most efficient cleaning cycle and enhanced pool safety.

Processing of the images are performed on a computer processor which is located either in the cloud or on a processor imbedded on the robotic cleaner or the caddy for such robotic cleaner. The system uses unique neural networks created using deep learning technologies to identify such objects and events in real-time.

The present invention provides a detection and tracking system for use in and around water-related environments (pool, sea, jacuzzi, etc) comprising: one or more image capturing units mounted on the robotic cleaner or inside the pool, and a processing unit enabling real-time detection and tracking of objects; wherein said processing can be performed either on the robotic cleaner or the caddy for such a cleaner, a network video recorder device or on a cloud device.

The present invention uses deep learning algorithms (such as artificial neural networks) that perform video analytics using a method comprising the following steps:
a. The video stream from the camera is fed into the system,
b. In each frame the system extracts features and uses the deep learning algorithms to identify if the image consists of a person and/or object defined by the system.
c. Recognize and distinguish between different types of objects such as an adult, child, toddler, dog, cat, etc as well as objects like skimmers, stars, jets, drains and other such objects that would be expected to be inside a swimming pool or jacuzzi.
d. The identification and classification of each object is then cross referenced with the specific location of the object as recognized by the system and the areas of interest as outlined in point a above.

The present invention provides a detection and tracking method comprising the following steps:
a. Identification and classification of objects in and around the area of a body of water using deep learning algorithms (such as artificial neural network).
b. Track each said object in real-time while counting how many objects are visible in the defined area of interest, which is primarily areas in and around the body of water.
c. Identify if one or more objects are missing for more than a defined period of time in a specific area of interest.
d. Report a suspected event to the user.

In yet another aspect, the detection and tracking method comprises the following steps:
a. Identification of a family member using deep learning algorithms.
b. Using image data from sources made available to the system which include (but not limited to) social media, digital family photo albums and information retained by the system.
c. The present invention uses a system that learns over time how each user looks like, how they act in the swimming pool and how long they typically stay in and around the pool area.
d. Report a suspected event to the user if any abnormal activity is identified.

The present invention uses a system capable of self-learning to identify individual persons and figures over time, determine which behavior marks a hazardous situation (without the need to pre-setup) and identify ages and identity of allowed and un-allowed persons that use the pool.

Self-learning capabilities provide flexibility and a user specific operation. These personal matching abilities can assist in achieving a more reliable hazard and drowning detection. The self-learning identification ability can be used to detect and alarm in a presence of an intruder or under age user while avoiding false alarms when an authorized person is using the body of water.

The following description and drawings are directed to the facial recognition aspect of the present invention.

DETAILED DESCRIPTION OF THE PREFERRED EMBODIMENTS

The present invention is a system, method and application for the recognition, verification and similarity ranking of facial or other object patterns. While the techniques of the present invention have many applications in the general area of object recognition, they are particularly well suited to the task of face recognition. This task poses numerous difficulties particularly where many variations can be expected in the appearance of the facial image to be recognized. The techniques of the present invention result in a system which can verify a match between two facial images where significant differences may occur between the images.

Figure 1:
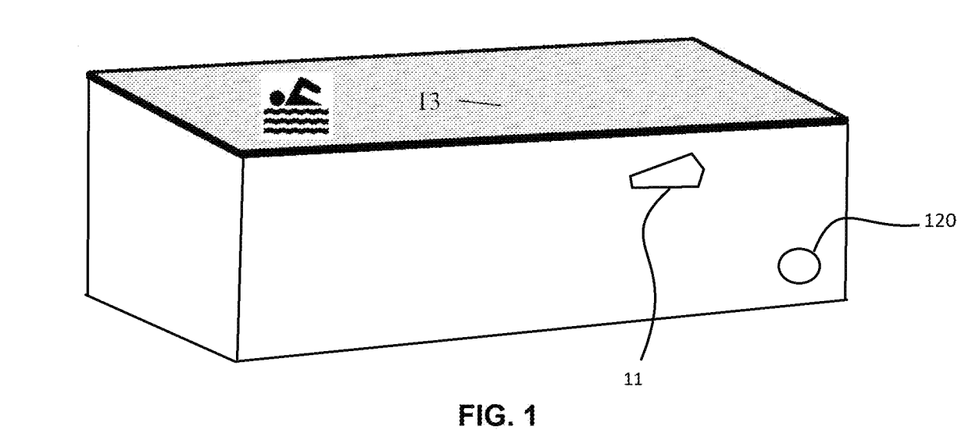
FIG. 1 is a diagram of the areas of interest in the example of a swimming pool and positioning of the camera unit for the purpose of image capturing.

In FIG. 1, a camera unit 11 is mounted on the robot, and alternatively a camera unit 120 is mounted inside the pool overlooking the bottom of the pool. Either camera can be either fixed or can have the capability to change its direction.

Upon set-up of the system boundaries between areas of interest are defined. These can be the underwater area in or the pool area itself. Additional areas of interest may be defined by the user. The use-case for this ability is not limited to any specific type of body of water and includes both man-made and natural bodies of water.

The camera unit 11 or the camera unit 120 acquires an image of the objects in its field of view that could include for example individuals in a swimming pool 13. The camera produces an image which includes, for example, the entire head and shoulders of the individual. In accordance with a process described in more detail below, this image is adaptively clipped to include just the immediate area of the individual's face to yield a clip which is the same size as the reference image.

Figure 2:
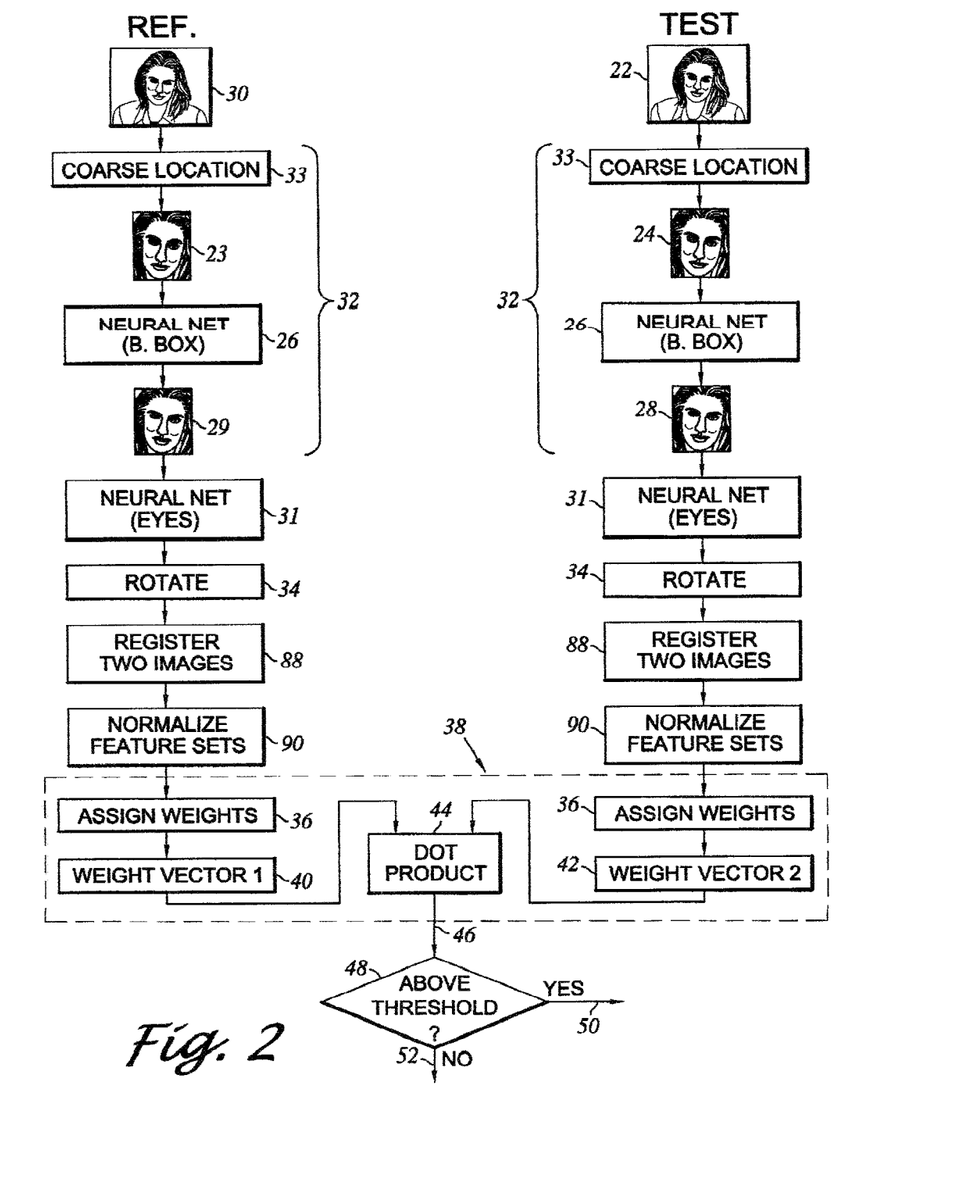
FIG. 2 is a diagram of the major steps performed by the face verification system in accordance with a preferred embodiment of the present invention.

This clip image is then transferred to an automated face locator 26 which performs the function of registering the position and orientation of the face in the image. In accordance with a technique which will be described in more detail below, in the preferred embodiment of the present invention the location of the face is determined in two phases. First, the test image 22 is found by defining a bounding box, resulting in image 24. The location of the bounding box is based on a number of features. Second, the location of the individual's eyes is determined. Once the location of the eyes is determined, the face is rotated about an axis located at the midpoint (gaze point) between the eyes to achieve a precise vertical alignment of the two eyes. The purpose of the automated face locator 26 is to achieve a relatively precise alignment of the image 24 with the test and reference image 16. It will be appreciated that an automated face locator 26 will also be used to locate the face in the test and reference image 16. It should be noted that the adaptive automated face locator 26 is needed to locate the face in the test and reference image 16, because with standard (non-adaptive) image processing techniques, the derived outline of the face will necessarily include the outline of the hair. However, in accordance with the present invention the image 24 defined by the bounding box will not include the hair.

In any event, it is important that the resulting test image 28 be accurately registered with respect to the reference image. That is, in accordance with the preferred embodiment described in more detail below an accurate location of the eyes is determined for the reference image and an accurate location for the eyes is determined for the image 24. The two images are then registered so that the location of the midpoint between both eyes are registered in both images. This is important because the automated face verifier 18 will be attempting to determine whether the two images are those of the same person. If the two images are misregistered, it is more likely to incorrectly determine that the two images of the same person are from different persons because similar features will not be aligned with similar features.

The automated face verifier receives the clipped and registered reference image and resulting test image 28 and makes a determination of whether the persons depicted in the two images are the same or are different. This determination is made using a neural network which has been previously trained on numerous faces to make this determination. However, once trained, the automated face verifier is able to make the verification determination without having actually been exposed to the face of the individual.

Initially a test image 22 and a reference image 30 are acquired. These images are then both processed by a clip processor 32 which defines the bounding box containing predetermined portions of each face. It will be appreciated that, in general, the reference prerecorded image may be stored in various ways. The entire image of the previous facial image may be recorded as shown in the reference image 30 in FIG. 2, or only a previously derived clip may be stored. Also, a clip that is compressed in a compression method for storage may be stored which is then decompressed from storage for use. In addition, some other parameterization of the clip may be stored and accessed later to reduce the amount of storage capacity required. Alternatively, the prerecorded image may be stored in a database as discussed above.

The reference image 30 and test image 22, respectively are then clipped. This occurs in two stages. First, a coarse location is found in step 33. This yields the coarse location of the image shown in Blocks 23 and image 24. Next, a first neural network is used to find a precise bounding box shown in Blocks 29. In a preferred embodiment the region of this bounding box is defined vertically to be from just below the chin to just above the natural hair line (or implied natural hair line if the person is bald). The horizontal region of the face in this clipping region is defined to be between the beginning of the ears at the back of the cheek on both sides of the face. If one ear is not visible because the face is turned at an angle, the clipping region is defined to be the edge of the cheek or nose, whichever is more extreme. This process performed by clip processor 32 will be described in more detail below in connection with FIG. 3.

Next, a second neural network 31 is used to locate the eyes. The image is then rotated in step 34 about a gaze point as described in more detail in FIG. 4. The above steps are repeated for both the reference and the test images. The two images are then registered in step 88, using the position of the eyes as reference points.

Next, the registered images are normalized in step 90. This includes normalizing each feature value by the mean of all the feature values. It should be noted that the components of the input image vectors represent a measure of a feature at a certain location, and these components comprises continuous valued numbers.

Next, a third neural network 38 is used to perform the verification of the match or mismatch between the test image 22 and reference image 30. First, weights are assigned in block 36, as described in more detail connected with in FIG. 5. It should be noted that the location of the weights and features are registered. Once the weight assignments are made the appropriate weights in the neural network 38 are selected. The assigned reference weights comprise a first weight vector 40 and the assigned test weights comprise a second weight vector 42. The neural network 38 then determines a normalized dot product of the first weight vector and the second weight vector in block 44. This is a dot product of vectors on the unit circle in N dimensioned space, wherein each weight vector is first normalized relative to its length. A well-known technique for normalizing such vectors is used in vector quantization, which is commonly used in connection with Kohonen neural networks. For further details with respect to normalization and related Kohonen neural networks see Wasserman, Neural Computing Theory and Practice, Van Nostrand Reinhold (1989). pp. 63-71 and pp. 201-209 which is incorporated in its entirety herein by reference.

The result is a number which is the output 46 of the neural network 38. This output is then compared to a threshold in decision step 48. Above threshold outputs indicate a match 50 and below threshold outputs indicate a mismatch 52.

Figure 3:
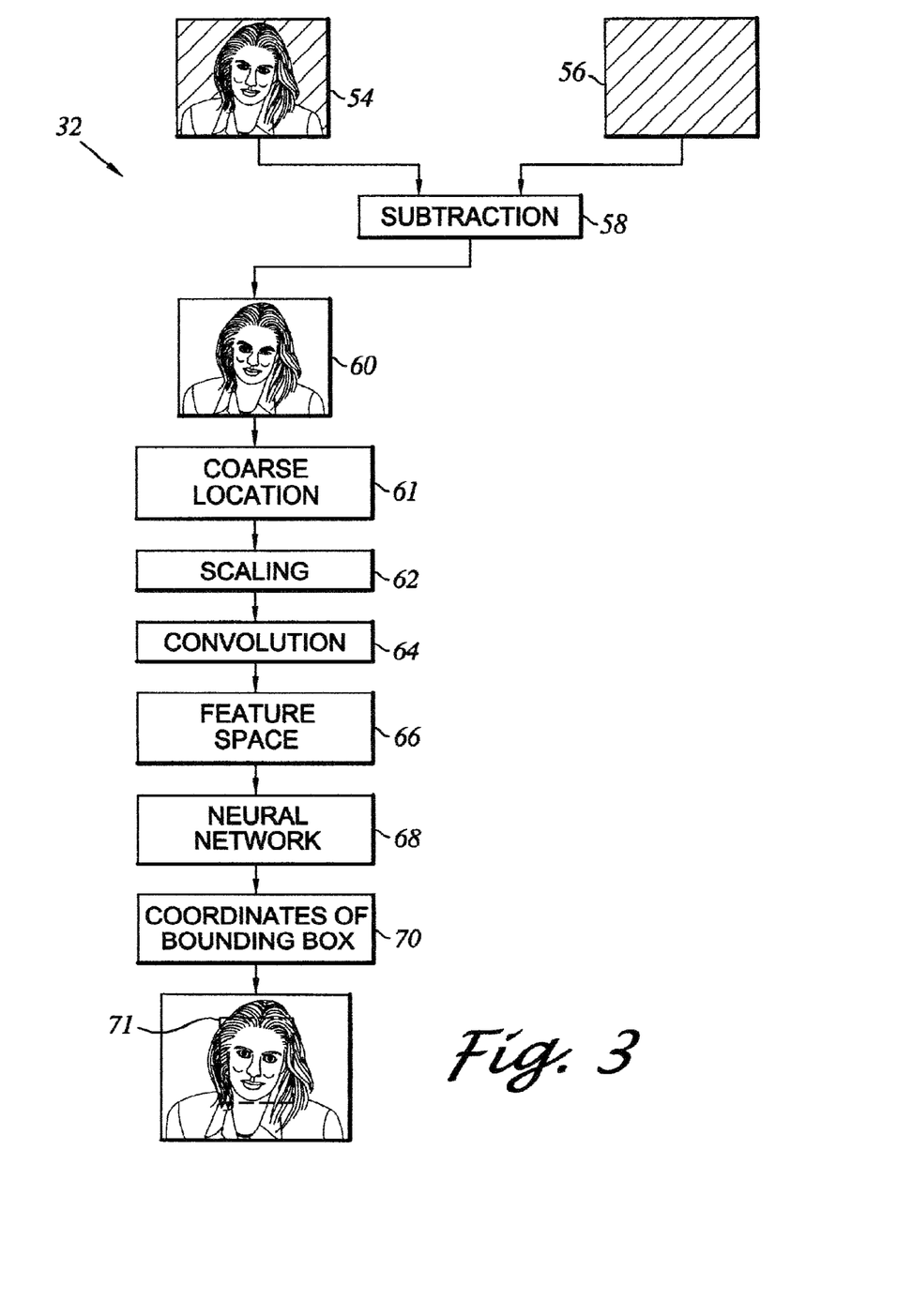
FIG. 3 is a diagram of the major steps involved in deriving a facial image bounding box in accordance with the present invention.

The above process will now be described in more detail. Referring to FIG. 3, the clip processor 32 is shown. An acquired image 54 may comprise either the test or the reference image. This image includes the face of the subject as well as additional portions such as the neck and the shoulders and also will include background clutter. An image subtraction process is performed in accordance with conventional techniques to subtract the background. For example, an image of the background without the face 56 is acquired. The image of the face and background is then subtracted from the background (block 58). The result is the facial image without the background 60. In step 61 standard, non-adaptive edge detection image processing techniques are used to determine a very coarse location of the silhouette of the face. It is coarse because this outline is affected by hair, clothing, etc.

Next the image is scaled down, for example, by a factor of 20 (block 62). This would reduce a 100 pixel by 80 pixel image down to 5×5. The image is then scaled down. For example, the total resulting image may include the following scales: 5×5, 6×6, 7×7, 10×10, 12×12, 16×16 and 18×18. This results in a hierarchy of resolutions. With regard to scaling it should be noted that the convolution types and sizes are identical for all images at all scales; and because they are identical, if the images are first scaled down to have coarsely scaled inputs then the convolutions will yield a measure of more coarse features. Conversely, if higher resolution inputs are used (with the same size and type kernel convolution) then the convolution will yield finer resolution features.

Thus, the scaling process results in a plurality of features at different sizes. Accordingly, the next step is to perform a convolution on the scaled image in block 64. For example this may be a 3×3 convolution. In the preferred embodiment the convolutions used have zero-sum kernel coefficients.

Also, a plurality of distributions of coefficients are used in order to achieve a plurality of different feature types. These may include, for example, a center surround, or vertical or horizontal bars, etc. This results in different feature types at each different scale. Steps 62 and 64 are then repeated for a plurality of scales and convolution kernels. This results in a feature space set 66 composed of a number of scales ("S") a number of features ("F") based on a number of kernels ("K"). This feature space then becomes the input to a neural network 68. In the preferred embodiment this comprises a conventional single layer linear proportional neural network which has been trained to produce as output the coordinates of the four corners of the desired bounding box 70 when given the facial outline image as input.

A description of a neural network suitable for this purpose may be found in the article, M. Kuperstein, "Neural Model of Adaptive Hand-eye Coordination For Single Postures", SCIENCE Vol. 239 pp. 1308-1311 (1988), which is herein incorporated by reference. Optionally, a hierarchical approach may be employed in which the feature space is transformed by a series of neural networks into bounding boxes that are increasingly closer to the desired bounding box. That is, the first time through the first neural network the output is a bounding box which is slightly smaller than the perimeter of the image and that box is clipped out and the features redefined and put into another neural network that has an output which is a bounding box that is a little closer to the desired bounding box. By repeating this process interactively until the final desired bounding box 71 is achieved, it has been found that the amount of noise with each iteration was reduced and the result is a more stable convergence to the desired bounding box with each neural network. Adequate results have been achieved in this manner with a hierarchy of two neural networks. In the preferred embodiment weights in the neural network 33 are assigned according to the techniques shown in FIG. 5 and discussed below.

Figure 4:
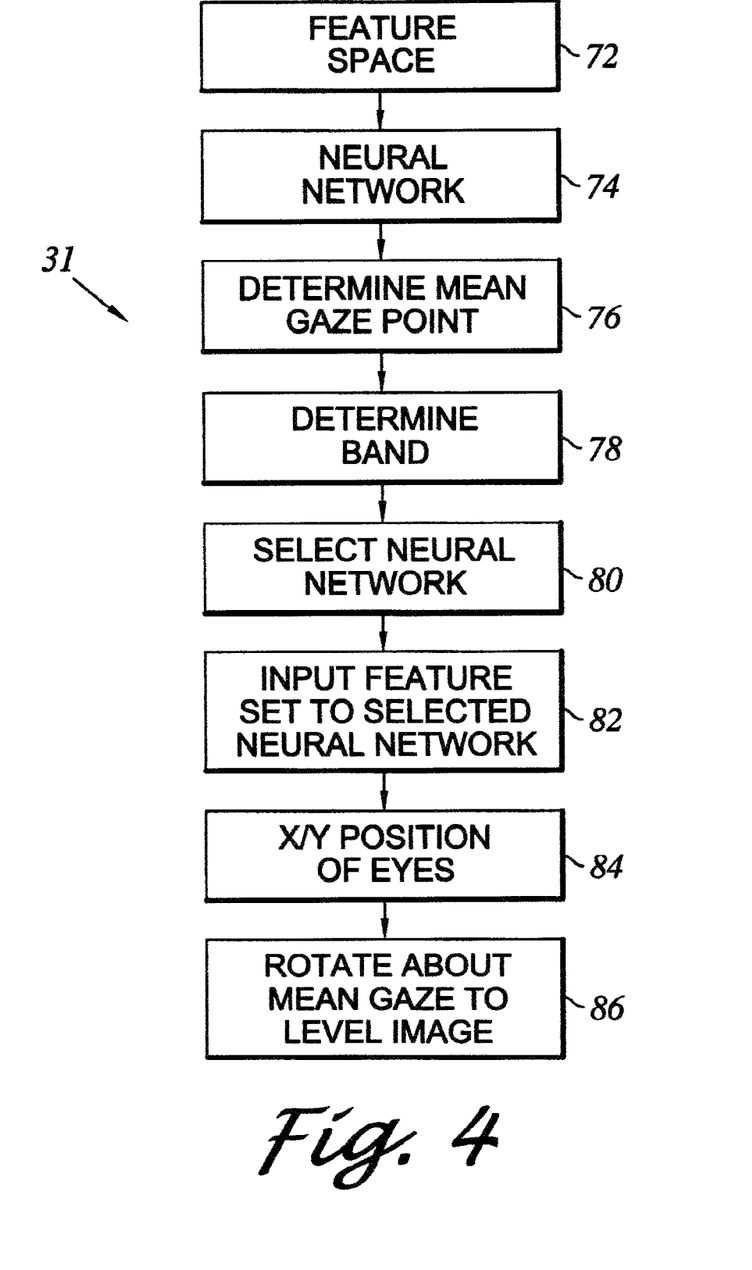
FIG. 4 is a diagram of the major steps involved in locating the eyes in a facial image in accordance with the present invention.

Referring now to FIG. 4, the process of locating the face within the bounding box is shown. The general approach of the present invention is to locate with some precision a given feature on the face and register the corresponding features in the reference and test images before performing the comparison process. In the preferred embodiment the feature used is the eyes. It will be appreciated that the eyes can be difficult to locate because of various factors such as reflections of light from glasses, from the eyes themselves, variations in shadows, etc. Further, the size of the eyes, their height, and other factors are all unknown. Because of this, an adaptive neural network is used to find the location of each of the eyes.

In more detail, first, the data outside the bounding box in feature space 66 (shown in FIG. 3) is eliminated. This feature space 72 (shown in FIG. 4) is input into a neural network 74 which has been trained to generate the x coordinate point of a single point, referred to as the "mean gaze". The mean is defined as the mean position along the horizontal axis between the two eyes. That is, the x position of the left and right eye are added together and divided by two to derive the mean gaze position. The neural network 74 may comprise one similar to the neural network 68 shown in FIG. 3, This neural network 74 is trained with known faces in various orientations to generate as output the location of the mean gaze. In the preferred embodiment weights in the neural network 74 are assigned according to the technique shown in FIG. 5 and discussed below.

Once the mean gaze is determined 76, a determination is made of which of five bands along the horizontal axis the gaze falls into. That is, a number of categories of where the gaze occurs are created. For example, these categories may determine whether the gaze occurred relatively within the middle or relatively in the next outer band, or in a third outer band of the total width of the face. These bands are not necessarily of equal width. For example, the center band may be the thinnest, the next outer ones a little wider and the final ones the widest. Wherever the computed mean gaze is located on the x coordinate will determine which band it falls into (step 78). Further, this will determine which of five neural networks will be used to find the location of the eyes (step 80) Next, the feature set is input to the selected neural network in step 82. This neural network has been trained to determine the x and y coordinates of eyes having the mean gaze in the selected band 84.

The use of a plurality of neural networks for the different bands has the effect of making the inputs to each of the networks with respect to themselves much more similar. This is important because of the highly variable appearance of faces depending on whether the gaze is forward, leftward or rightward. By the use of a hierarchy of neural networks which each correspond to a certain range of the gaze of the face the inputs to each of the networks with respect to themselves are much more similar.

Next, the entire face is rotated (in two dimensions) about the gaze point until the x and y position of the eyes are level on the horizontal axis in step 86. The gaze point becomes a reference point for registration of the test and reference images as indicated in step 88 in FIG. 2.

Next, the feature sets are normalized 90 (shown in FIG. 2). This is accomplished by, for example, normalizing each feature value by the mean amplitude of all feature values.

This normalization process normalizes against variations such as lighting conditions so that the feature set used in the neural network can withstand varying contrast or lighting conditions.

Next, in step 36 (in FIG. 2) the feature values are assigned to weights in the neural network 38. The preferred approach (for neural network 38, as well as for neural networks 31) will be to quantize the feature values from an analog number to a quantum number that is positive or negative. This is done by taking the whole range of values of all sets and quantize the range by certain ratios of twice the mean (positive and negative). Next, the positive feature value are ranked and the negative feature values are ranked with respect to their values. A set of positive ranks and a set of negative ranks are thereby defined. For a given feature value it can be assigned to a bin that is quantized by ranking the values. In the preferred embodiment this is done by defining the ranks by the fractions ⅓ and ½. In particular, all of the elements in the input vector (which comprises both positive and negative numbers) are used to determine their positive mean and their negative mean. For example, twice the positive mean may be 1000 and twice the negative mean may be 1500. Applying the fractions of ⅓ and ½ to 1000 would equal 333 and 500. Thus the first rank would equal components from 0333 the second rank between 334-500 and the third rank would be components greater than 500. Next, all the individual components of the input vector are placed in one of the three ranks based on their value. The same process is also performed for the negative components in the feature vectors, Next, each ranked component value is assigned a weight based on its rank. This process of assigning weights is described in more detail in FIG. 5. There are 6 bins, each bin corresponding to a weight. There are 3 negative and 3 positive bins throughout the total range of component values of −800 through +800. A four by four weight lookup table vector 92 is shown which contains 16 components of the feature vectors. For example, one of these components is 600, another is 400, another is −100. Also, a four by four weight vector 94 is depicted. Each of the 16 weight locations in the four by four weight vector 94 correspond to one of the 16 components of the feature vector. Each location in the weight vector has six different weights corresponding to six different ranks.

Figure 5:
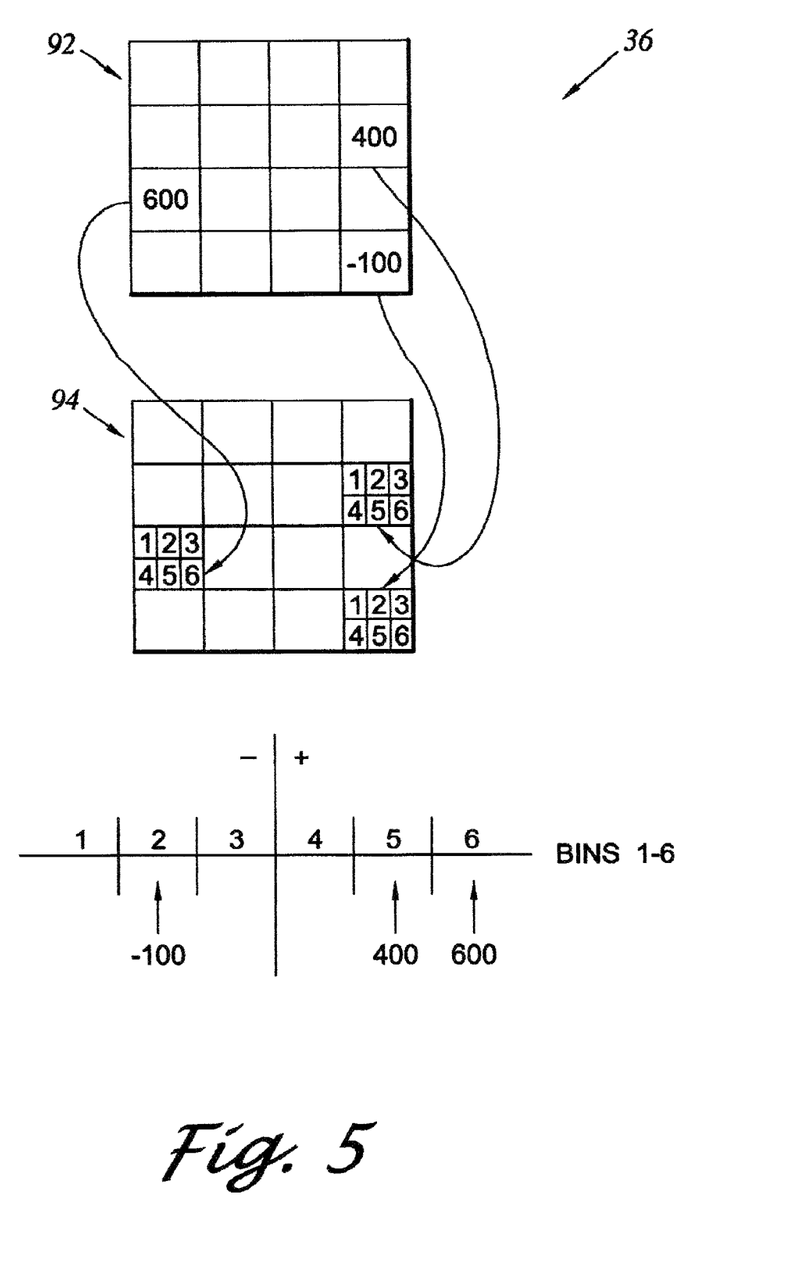
FIG. 5 is a diagram showing additional details of the process of selecting weights in accordance with the present invention.

In this example, there are three positive ranks and three negative ranks. As described above, each component in the feature vector is ranked. For example, 400 is determined to be of rank five, thus this component is mapped to the 5th of six weights within the corresponding location in the four by four weight vector 94. Similarly, the component having a value of 600 is put into the 6th rank and accordingly this feature vector is assigned to the weight value which exists in the third rank of its corresponding location of weight vector 94. The component having a value of −100 is assigned to the 2nd rank.

This process is repeated for all of the components of the feature vector. In an actual image, however, the feature vector may have many more components. There may be, for example, 10,000 components in the feature vector.

It should be noted that some components of feature vector may have a value of zero. When features values equal zero the system can decide to put these values in a bin or not. This decision is made differently for different neural networks. For the networks used to locate the bounding box and the eyes 30, feature values of zero are not used. However, for the matching neural network 38 feature values of zero are used for weights associations. This is because with the bounding box or the eyes the output of the neural net is a coordinate value and it is not desirable to have a non-feature contribute to the location of an x,y point. However, when the feature value for the face verification neural network 38 is zero, it is desirable to have that contribute to the result. For example, in a face, the absence of a feature (zero feature value) is an important indicator of a mismatch, whereas the absence of a feature is not important to locate the bounding box or the eyes. A non-zero value for a feature vector component means that a feature has been measured at that location while a zero indicated that no feature has been measured at that location.

It should also be noted that the actual values of the selected weights in the vector are adaptive and will be modified during training as described in more detail below.

Also, the exact weight chosen in the weight vector will depend on the preexisting value of that weight vector component. However, there is a fixed relationship between each location in the feature vector and the corresponding location in the weight vector (each of which has multiple weights, one for each rank).

Once the weight vector 94 has been determined for both the reference set and test feature set the neural network 38 computes the normalized dot product of the two weight vectors. In essence, this operation computes the sum of the products of corresponding elements of the two weight vectors. This is operation 44 shown in FIG. 2. It will be appreciated that the dot product output will be a number which is proportional to the similarity between the two weight vectors. That is, highly similar weight vectors are more parallel and will yield higher dot product outputs indicating that the faces are similar. Dissimilar weight vectors will yield lower valued dot product outputs indicating that the faces are less similar.

The fact that the dot product operation is a "normalized" dot product means that the dot product of the output 46 is normalized to the unit circle in N dimensional space. The normalization process is performed by dividing the dot product by the product of each of the vector lengths. The normalized dot product results in a confidence level and that confidence level is normalized by a linear transformation constant to get the range needed, i.e., 0-10 or 0-100. If the confidence measure is above a preset verification threshold then the result is "positive". This means that the face in the test clip depicts a face belonging to the same person as that in a reference clip. If the value is not above the predetermined threshold the result is "negative," which means that a test clip and reference clip depict faces of different people.

The procedure for training the neural network 38 to correctly perform the face matching procedure will now be described. Initially all of the weights are set to zero.

When two training facial images are input into the system, since all the weight values are zero the resulting dot product of the two weight vectors will also be zero. Because this is training data however it is known whether the two faces are from the same person or not. If they are from the same person then it is desired to have the result be a relatively high valued positive number. This is because matching feature vectors should produce above threshold outputs. The threshold may be selected arbitrarily to be at the midrange. When the two faces are from the same person, a starting positive value is selected and the two weight vectors are made to be the same positive value. If the two faces are from a different people then each weight value is given opposite assigned values, one starting value is positive and one is a negative but equal value.

Subsequently the neural network will be trained on many examples of pairs of faces, some of which match, and some of which do not match. A variety of faces in a variety of orientations and lighting conditions will be used to allow the neural network to generalize all of this information. As a result it will be able to recognize when two different views of the same person are actually the same person, and when two images of different people are in fact faces of different people.

The learning algorithm used in the preferred embodiment is as follows:

1. If the output 46 is correct make no changes to the weights. That is, a correct result means that two faces that are the same generate an output which is above threshold, and two faces which are from different persons generate an output that is below threshold.

2. If the result is negative (below threshold) and incorrect, adapt corresponding weights and weight vectors 1 and 2 to be closer to each other. The amount of adjustment is preferably a percentage of the difference between the two weights. This percentage is the learning rate for the adaptation. It should be noted that only weights which are selected by the feature sets 1 and 2 are adapted; non-selected weights are not. As discussed above, if both weight values are zero, (as in the initial condition) both weight values are changed to be a preset constant value.

3. If the output 46 is positive (above threshold) and incorrect, adapt the corresponding weights in weight vectors 1 and 2 to be farther from each other. Again, the amount of adjustment is a percentage of their difference. Only weights which are selected by the feature sets are adapted. If both the weight values are zero, the weight value of weight set 1 is set to the same preset constant value used in training step 2 above. However, the weight value from weight set 2 is set to the negative of this value.

The test images should comprise of pairs of randomly selected images of faces. Also, images of the same person should be used approximately half the time and images of different persons should be used about half the time. The objective of training is to give the system enough training with different orientations and different head postures etc. so it will be able to generalize across different head orientation and head postures.

Thus, the training example will include examples of a head looking straight, to the left, to the right, up and down.

For example, the system may be trained with images of 300 different people in different orientations. It is being trained not to recognize any specific face but instead it is being trained to recognize what is similar about different images of the same face. It is being trained to be a generalized face recognizer as opposed to being able to recognize any specific face.

In a preferred embodiment, hysteresis is used during learning. This means that to avoid learning the result must be above or below the threshold by a given amount. For example, if two test images are from the same face, and the threshold is defined as an output of 5 on a scale of 0 to 10, then to avoid learning the output must be 5+delta.

Thus any output less than the threshold of 5+delta will cause the system to adapt weights to be closer to each other. In this way, only results which are less ambiguously correct will avoid learning. Results which are correct, but only slightly above threshold will be further refined by additional training.

Likewise, when the system is trained with two training images of different faces, in order to avoid adaptation of the weights, the result must be below threshold by a given amount, for example below 5 minus delta. As a result any output above 5 minus delta will result in adaptation of the weights to produce less ambiguous results. In a preferred embodiment the delta amount used for the learning hysteresis may be 0.5. It should be remembered that this hysteresis is only used during the training procedure and not during actual use of the system on unknown faces. Thus, in actual use, where it is not known beforehand whether the faces match or not, any above threshold output will be considered to be a match and any result which is at or below threshold will be considered to be no match. It should be noted that the weights are always associated with a certain location in the neural network 38 and a certain feature of the neural network. However, every face is different so every image that comes from a different face will pick up different weights. But the weights themselves are always associate with a certain location and with a certain feature even though which weights are actually picked up depends on which face is being processed. As a result, the entire neural network will begin to average over all faces it has ever seen in its experience.

It should also be noted that the operations of the neural network 38 in accordance with the present invention is quite different from the prior techniques, such as the self-organizing maps of Kohonen as described, for example in the article R. Lippman, An Introduction to Computing with Neural Networks". IEEE ASSP Magazine, April 1987, pp 4-2, which is incorporated by reference. Those skilled in the art will appreciate that with the Kohonen method a dot product is taken between a single input and the weight vector in the neural network. The weight vector which generates the highest dot product is designated the "winner" and that weight vector is modified during training to be even closer to the input vector.

In contrast, in the present invention two inputs operate on the neural network simultaneously instead of just one. Further, in the present invention, each input vector selects weights in the neural network and the dot product between each of the two selected weight vectors is determined. During learning, in the present invention, both sets of weight vectors are adapted to be closer to each other or farther apart from each other. Thus it is important to recognize that the architectural and learning algorithm of the present invention are specifically adapted to perform a comparison between two inputs, unlike Kohonen network which is adapted to classify an input into one of several outputs or associate an input with an output. The Kohonen network does not perform the function of comparing the similarity between two inputs. Also, in the present invention the actual feature vector is never used in the dot product as its in Kohonen networks. In the present invention only weights are used in the dot product operation. Also in the Kohonen system initially the weights are set to random values; in the present invention weights are initially set to zero.

Another advantage of the present invention is that it can be trained to generate a high matching value for incompatible looking objects. This is a major advantage over prior art approaches to face recognition. For example, suppose input vectors one and two representing facial images were identical. If a dot product is performed on the two images and they are identical, the result would be very high. However, if the images are offset by even one or two pixels then the dot product will be very low because everything is misregistered. In contrast, with the technique of the present invention the system can be trained to generate a matching output for different appearing objects. For example, if the input images were of an apple and an orange each image would select weight vectors and those weight vectors would be trained on various images of apples and oranges to generate a high dot product value. Yet a dot product between the raw image of the apple and orange would yield a very low value.

This malleable nature of the present invention is important because the human face varies tremendously whenever the orientation and lighting etc. of the face is changed. The present invention achieves the goal of being able to match images that are in some ways incompatible. This approach works because it defers the dot product operation to a reference of the inputs (the weight vectors) and does not perform the dot product on the raw image.

Of course, there are limits as to how variable the inputs can be even with the present invention. If input images vary too widely the training process will average weights according too wide a variability and the results will be unsatisfactory. This is why it is important to reliably produce the registration of the images; for example by achieving a very good location of a particular feature (for example, the eyes). If instead this feature is mislocated the faces will be misregistered and the results will be less reliable.

Further, while the preferred embodiment employs neural networks to perform verification, other adaptive processors could be used including, but not limited to, genetic algorithms, fuzzy logic, etc. In general adaptive processors are those which can perform facial verification for faces that vary by head orientation, lighting conditions, facial expression, etc., without having explicit knowledge of these variations. Thus, one could substitute another type of adaptive processor for the neural network in the present invention.

Optimise the Pool Cleaning Cycle and Navigate Using Image Data

One embodiment of the present invention utilizes a robot that moves throughout a pool or other enclosed water area.

The robot optimises the pool cleaning cycle, as well as utilizes the safety monitoring system described previously, including facial recognition and neural networks. The robot utilizes image data from the camera unit in order to determine the optimal course for navigation, in the sense that the course does not impact any people or toys or other objects in the pool. The robot continuously learns and continuously analyses data such that its course continues to shift, as is necessary considering there are moving persons and objects in the body of water.

The robot utilizes the methods described previously in order to recognize a person versus another object. It is a process utilizing deep learning and neural networks, as described previously.

Identifying and Tracking Persons

Furthermore, the robot enhances safety by identifying and tracking persons utilizing the safety monitoring system described previously. This is because in the event that the robot tracks a person in danger in the water, such as from drowning, the system generates an alert and makes a loud alarm, or alternatively contacts the person/authorities.

The camera used for the robot navigation may also be mounted inside the pool overlooking the bottom of the pool and the robot, either from a fixed or variable position, also utilizes the safety monitoring system described previously.

Game Platform

Another embodiment of the present invention is that the robot also acts as a game platform in the sense that the camera unit on the robot facilitates augmented reality games.

The robot has an internet connection and on-board sensors which generate data that is relayed to a cloud based computer processor. Such sensors include, but are not limited to: GPS, gyroscope, accelerometer, and all sensors that are available in modern smartphones.

The user is not in the pool, the user is using a mobile device which receives streaming video and other data from the cloud based processor.

The game uses the data from the robot to locate, capture, battle, and train virtual creatures, called Pool Game, which appear as if they are in the player's real-world location within the pool.

The game uses augmented reality in the sense that the game displays Pool Game throughout the pool that are not physically in existence.

As the robot move within the pool, both above water and below water, the user's avatar moves within the game's map. Different Pool Game characters reside in different areas of the pool and respond to the identification and tracking using facial recognition as previously described for the safety feature.

Augmented reality mode uses the camera on the robot to display an image of a Pool Game as though it were in the real world.

Players earn experience points for various in-game activities. Players rise in level as they earn experience points (XP), with various features being progressively unlocked.

Deep Learning Navigation

The robot will also utilize deep learning, a form of machine learning, in order to navigate more skillfully and efficiently, in order to keep better track and avoid various obstacles and/or people in a pool or enclosed water area. Deep learning (also known as deep structured learning or hierarchical learning) is part of a broader family of machine learning methods based on learning data representations, as opposed to task-specific algorithms. Learning can be supervised, semi-supervised or unsupervised, however in the present invention learning will be unsupervised.

Deep learning is a class of machine learning algorithms that:
use a cascade of multiple layers of nonlinear processing units for feature extraction and transformation. Each successive layer uses the output from the previous layer as input.
learn in unsupervised manners such as pattern analysis.
learn multiple levels of representations that correspond to different levels of abstraction; the levels form a hierarchy of concepts.

One embodiment of the present invention is a robot that analyzes the local geographic features of a pool or enclosed water area, and uses pattern analysis to learn the different and optimal directions to move in. The facial recognition described previously is helpful in terms of tracking persons and avoiding those persons. The robot may even learn to predict the movement of persons and objects so as to avoid them more skillfully, and track them more skillfully.

Figure 6:
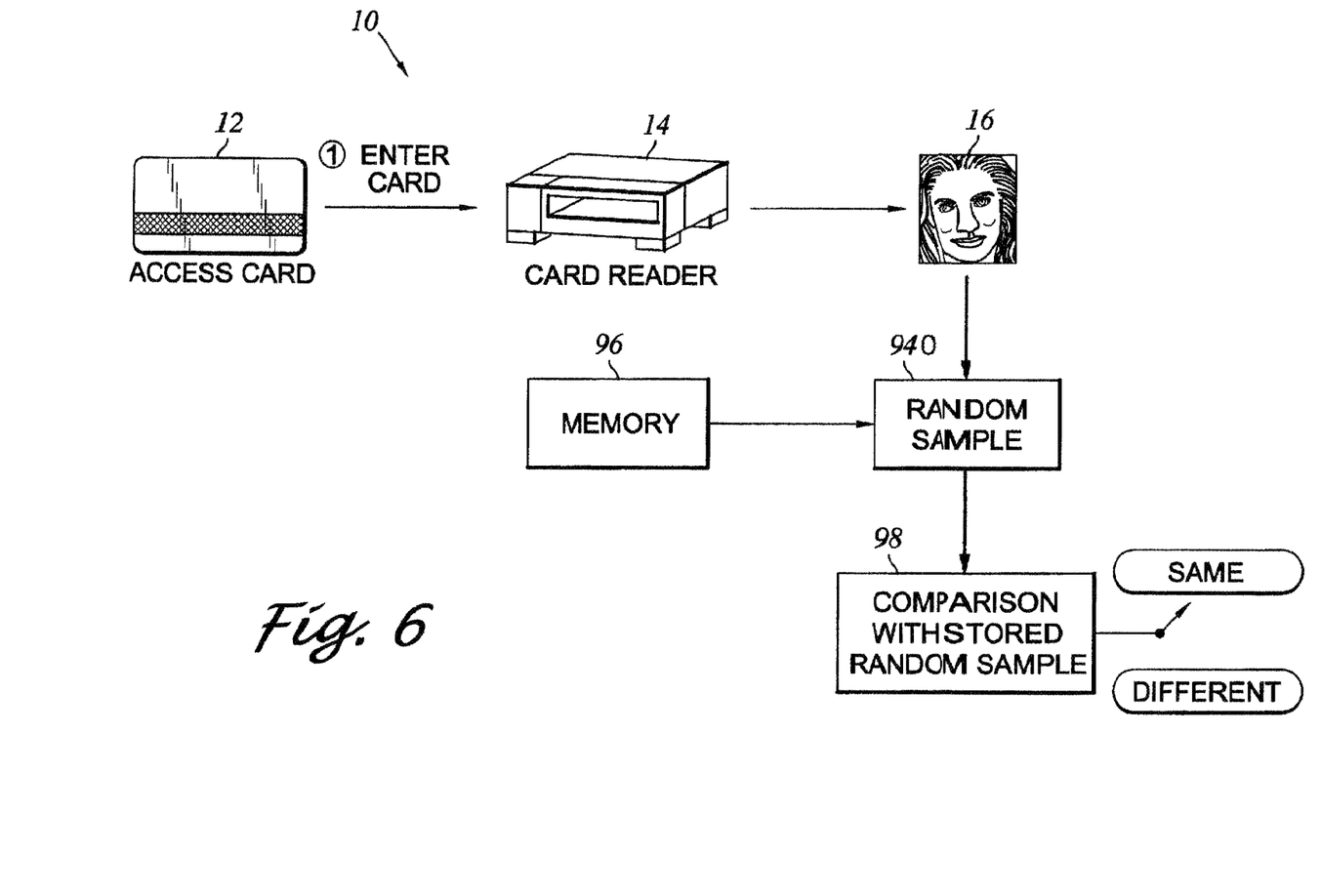
FIG. 6 is a diagram showing additional details of using the access card and card reader, in accordance with the present invention.

In FIG. 6, access card 12 is entered (step 10) into card reader 14. The card reader 14 scans the access card 12 in order to generate image 16. A random sample 940 is acquired from memory 96, wherein the random sample 940 is the system's attempt to find a similar image in memory 96 similar to image 16. In step 98, image 16 is compared with random sample 940, and a decision is made as to whether those images are the same or different.

It will also be appreciated by those skilled in the art that all of the functions of the present invention can be implemented by suitable computer programming techniques. Also, it will be appreciated that the techniques discussed above have applications outside facial recognition and matching.

The invention claimed is:

1. A detection and tracking system using a camera unit on a robot for safety monitoring for use in and around water-related environments comprising:
   a processing unit enabling real-time detection and tracking of objects;
   wherein the robot is able to propel itself and move throughout a body of water, both on a surface and underwater;
   wherein the camera unit functions both on the surface and underwater;
   wherein the robot optimizes a cleaning cycle of the body of water utilizing deep learning techniques;
   wherein the robot has localization sensors and software that allow the robot to be aware of a position of the robot in a pool;
   wherein the camera unit is able to send its video feed live over an internet; wherein processing is performed in a cloud; wherein the robot sends and receives data from the cloud;
   wherein the processing utilizes deep learning algorithms, including artificial neural networks, that perform video analytics using a method comprising the following steps:
   a. areas of interest around the body of water are defined upon initial set up of the system; in a man-made body of water, area surrounding the pool would be defined as Area 1 and the pool itself would be defined as Area 2; in a context of an ocean, such interest areas are a beach area, the ocean and any other pre-defined areas;
   b. in each frame the system extracts features and uses the deep learning algorithms to identify if an image consists of a person and/or object defined by the system; this analysis is performed in real-time with no time delay;

c. the system recognizes and distinguishes between different types of objects, as well as stationary objects;

d. an identification and classification of each object is then cross referenced with a specific location of the object as recognized by the system and the areas of interest as outlined in point a above.

2. The system of claim 1 that uses a system capable of self-learning to personally identify individual persons and figures over time, determine which behavior marks a hazardous situation, without a need to pre-setup, and identify ages and identity of allowed and un-allowed persons that use the pool.

3. The system of claim 1 further comprising:
self-learning capabilities that provide flexibility and a user specific operation;
wherein the self-learning capabilities can be used to detect and sound an alarm in presence of an intruder or under age user while avoiding false alarms when an authorized person is using the body of water;
the self-learning capabilities also provide the robot with an ability to navigate through the body of water without impacting any persons or the objects;
the self-learning capabilities also provide the robot with an ability to closely track the persons in the body of water at an increasingly level of accuracy.

4. The system of claim 1, further comprising:
wherein boundaries between areas of interest are defined;
one boundary is an area in the vicinity of the pool;
another boundary is for the pool area itself;
additional areas of interest may be defined by a user;
the camera unit acquires an image of the objects in a field of view of the camera unit that includes individuals in a swimming pool;
the camera unit produces an image which includes a full view of head and shoulders of each individual;
this image of the objects is adaptively clipped to include just an immediate area of a face of the individual to yield a clip which is a same size as a reference image;
this clip image is then transferred to an automated face locator which performs a function of registering position and orientation of the face in the image of the objects;
a location of the face is determined in two phases:
first, the clip image is found by defining a bounding box, resulting in a bounding box based image;
second, a location of eyes of the individual is determined;
once the location of the eyes is determined, the face is rotated about an axis located at a midpoint (gaze point) between the eyes to achieve a precise vertical alignment of the eyes;
this results in the automated face locator having a relatively precise alignment of a test image with the reference image;
then the automated face locator will be used to locate the face in the test image;
the clip image defined by the bounding box will not include hair.

5. The system of claim 4, further comprising:
an accurate location of the eyes is determined for the reference image and an accurate location for the eyes is determined for the test image;
the reference image and test image are then registered so that the location of the midpoint between both eyes are registered in both the reference image and test image;
an automated face verifier then attempts to determine whether the reference image and the test image are those of a same person.

6. The system of claim 1, further comprising:
an automated face verifier receives a clipped and registered reference image and a test image and makes a determination of whether the persons depicted in the reference image and h test image are the same or are different;
this determination is made using a neural network which has been previously trained on numerous faces to make this determination;
once trained, the automated face verifier is able to make the determination without having actually been exposed to a face of the individual whose face is being verified.

7. The system of claim 6, further comprising:
the test image and the reference image are acquired;
these images are then both processed by a clip processor which defines a bounding box containing predetermined portions of each face;
the reference image may be stored in various ways;
i) either an entire image of a previous facial image may be recorded
ii) or only a previously derived clip may be stored;
iii) or a clip that is compressed in a compression method for storage may be stored which is then decompressed from storage for use;
iv) or some other parameterization of the clip may be stored and accessed later to reduce an amount of storage capacity required
v) or the reference image may be stored in a database;
then the reference and test images are clipped, this occurs in two stages:
first, a coarse location of a silhouette of a face is found;
next, a first neural network is used to find a precise bounding box;
a region of this bounding box is defined vertically to be from just below a chin to just above a natural hair line, or implied natural hair line if the person is bald;
a horizontal region of the face in a clipping region is defined to be between a beginning of ears at a back of a cheek on both sides of the face;
if one ear is not visible because the face is turned at an angle, the clipping region is defined to be an edge of the cheek or nose, whichever is more extreme;
this process performed by the clip processor;
next, a second neural network is used to locate eyes;
a resulting image of the eyes is then rotated about a gaze point;
the above steps are repeated for both the reference and the test images;
the test image and reference image are then registered using position of the eyes as reference points.

8. The system of claim 7, further comprising:
the registered images are normalized;
this includes normalizing each feature value by a mean of all the feature values;
components of input image vectors represent a measure of a feature at a certain location, and these components comprise continuous valued numbers;
next, a third neural network is used to perform a verification of a match or mismatch between two faces;
first, weights are assigned;
location of the weights and features are registered;
once the weight assignments are made appropriate weights in the third neural network are selected;

assigned reference weights comprise a first weight vector and assigned test weights comprise a second weight vector;

the third neural network then determines a normalized dot product of the first weight vector and the second weight vector;

this is a dot product of vectors on a unit circle in N dimensioned space, wherein each weight vector is first normalized relative to its length;

a result is a number which is an output of the third neural network;

this output is then compared to threshold outputs;

above the threshold outputs indicate a match and below threshold outputs indicate a mismatch.

9. The system of claim 1, further comprising:

an acquired image may comprise either a test or a reference image;

the reference image includes a face of the person as well as additional portions such as neck and shoulders and also will include background clutter;

an image subtraction process is performed to subtract the background;

an image of the background without the face is acquired;

the image of the face and background is then subtracted from the background;

a result is a facial image without the background;

then non-adaptive edge detection image processing techniques are used to determine a very coarse location of a silhouette of the face;

next the reference image is scaled down by a factor of 20;

this results in a hierarchy of resolutions;

if the test and reference images are first scaled down to have coarsely scaled inputs then convolutions will yield a measure of more coarse features;

conversely, if higher resolution inputs are used with a same size and type kernel convolution then the convolutions will yield finer resolution features;

thus, a scaling process results in a plurality of features at different sizes;

the next step is to perform a convolution on the scaled reference image;

the convolutions used have zero-sum kernel coefficients;

a plurality of distributions of coefficients are used in order to achieve a plurality of different feature types, including a center surround, vertical and/or horizontal bars;

this results in different feature types at each different scale;

then repeated for a plurality of scales and convolution kernels this results in a feature space set composed of a number of scales, a number of features, based on a number of kernels;

this feature space then becomes an input to a neural network;

this comprises a conventional single layer linear proportional neural network which has been trained to produce as output coordinates of the four corners of the desired bounding box when given a facial outline image as input.

10. The system of claim 9, further comprising:

the processing unit locating a given feature on the face and registering the corresponding coarse features in the reference and test images before performing the comparison process;

wherein the coarse feature used is eyes;

wherein an adaptive neural network is used to find a location of each of the eyes;

first, data outside the bounding box resulting from the feature space is eliminated;

this feature space is input into a neural network, which has been trained to generate a x coordinate point of a single point, referred to as a "mean gaze";

the mean gaze is defined as the mean gaze position along a horizontal axis between the eyes referred to earlier;

a x position of a left and right eye are added together and divided by two to derive the mean gaze position;

the neural network is trained with known faces in various orientations to generate as output the mean gaze position once the mean gaze is determined, a determination is made of which of five bands along the horizontal axis the mean gaze falls into;

a number of categories of where the mean gaze occurs are created;

wherever a computed mean gaze is located on the x coordinate will determine which band it falls into;

this will determine which of five neural networks will be used to find the location of the eyes;

next, a feature set is input to the neural network determined earlier;

the neural network determined earlier has been trained to determine x and y coordinates of eyes having the mean gaze in a selected band, wherein the x coordinate is different from the x coordinate mentioned earlier.

11. The system of claim 10, further comprising:

wherein the robot acts as a game platform such that the camera unit on the robot facilitates augmented reality games;

wherein a user of those games is not in the pool, but instead is using a mobile device outside the pool;

wherein the augmented reality game on the mobile device constantly receives and sends data to the cloud, and the robot constantly sends and receives data to the cloud, such that the augmented reality game involves creatures and locations throughout the pool that are not physically present, but are visible to the user on the mobile device;

wherein the data the robot sends to the cloud is based on the localization sensors and software of the robot, and this data is used as part of the augmented reality game to display the creatures and other aspects of the augmented reality game.

12. The system of claim 10, further comprising:

wherein the robot utilizes deep learning, a form of machine learning, in order to navigate more skillfully and efficiently, and in order to keep better track of persons in the body of water;

wherein the robot utilizes the deep learning by using a cascade of multiple layers of nonlinear processing units for feature extraction and transformation;

wherein each successive layer uses output from a previous layer as input;

wherein learning is unsupervised and in a form of pattern analysis;

wherein the robot analyses local geographic features of the body of water, and uses pattern analysis mentioned earlier to learn different and optimal directions to move in;

wherein the robot tracks the persons and avoids any persons in the body of water;

wherein the robot attempts to learn to predict movement of h persons and the objects in the body of water so as to avoid them more skillfully, and track them more skillfully.

13. A detection and tracking system using a camera mounted inside a pool overlooking a bottom of the pool, and a robot that uses a video from the camera for navigation and for safety monitoring for use in and around water-related environments comprising:
   a processing unit enabling real-time detection and tracking of objects;
   wherein the robot is able to propel itself and move throughout a body of water, both on a surface and underwater;
   wherein the robot optimizes a cleaning cycle of the body of water utilizing deep learning techniques;
   wherein the robot has localization sensors and software that allow the robot to be aware of a position of the robot in the pool;
   wherein the camera is able to send its video feed live over an internet;
   wherein the processing is performed in a cloud;
   wherein the robot sends and receives data from the cloud;
   wherein processing utilizes deep learning algorithms, including artificial neural networks, that perform video analytics using a method comprising the following steps:
   a. areas of interest around the body of water are defined upon initial set up of the system; in a man-made body of water, area surrounding the pool would be defined as Area 1 and the pool itself would be defined as Area 2; in a context of an ocean, such interest areas are a beach area, the ocean and any other pre-defined areas;
   b. in each frame the system extracts features and uses the deep learning algorithms to identify if an image consists of a person and/or object defined by the system; this analysis is performed in real-time with no time delay;
   c. the system recognizes and distinguishes between different types of objects, as well as stationary objects;
   d. identification and classification of each object is then cross referenced with a specific location of the object as recognized by the system and the areas of interest as outlined in point a above.

14. The system of claim 13, further comprising:
   wherein the robot acts as a game platform such that the camera overlooking the bottom of the pool and the robot together facilitate augmented reality games;
   wherein a user of those games is not in the pool, but instead is using a mobile device outside the pool;
   wherein the augmented reality game on the mobile device constantly receives and sends data to the cloud, the robot constantly sends and receives data to the cloud, and the camera mounted inside the pool overlooking the bottom of the pool constantly sends and receives data to the cloud, such that the augmented reality game involves creatures and locations throughout the pool that are not physically present, but are visible to the user on the mobile device;
   wherein the data the robot sends to the cloud is based on the localization sensors and software of the robot, and this data is used as part of the augmented reality game to display the creatures and other aspects of the augmented reality game.

15. A detection and tracking method using a camera unit on a robot for safety monitoring for use in and around water-related environments comprising:
   a processing unit enabling real-time detection and tracking of objects;
   wherein the robot is able to propel itself and move throughout a body of water, both on a surface and underwater;
   wherein the camera unit functions both on the surface and underwater;
   wherein the robot optimizes a cleaning cycle of the body of water utilizing deep learning techniques;
   wherein the robot has localization sensors and software that allow the robot to be aware of a position of the robot in a pool;
   wherein the camera is able to send its video feed live over an internet;
   wherein processing is performed in a cloud;
   wherein the robot sends and receives data from the cloud;
   wherein the processing utilizes deep learning algorithms, including artificial neural networks, that perform video analytics using a method comprising the following steps:
   a. areas of interest around the body of water are defined upon initial set up of the system; in a man-made body of water, area surrounding the pool would be defined as Area 1 and the pool itself would be defined as Area 2; in a context of an ocean, such interest areas are a beach area, the ocean and any other pre-defined areas;
   b. in each frame the system extracts features and uses the deep learning algorithms to identify if an image consists of a person and/or object defined by the system; this analysis is performed in real-time with no time delay;
   c. the system recognizes and distinguishes between different types of objects, as well as stationary objects;
   d. identification and classification of each object is then cross referenced with a specific location of the object as recognized by the system and the areas of interest as outlined in point a above.

16. The method of claim 15 that uses a system capable of self-learning to personally identify individual persons and figures over time, determine which behavior marks a hazardous situation, without a need to pre-setup, and identify ages and identity of allowed and un-allowed persons that use the pool.

17. The method of claim 15 further comprising:
   self-learning capabilities that provide flexibility and a user specific operation;
      the self-learning capabilities can be used to detect and sound an alarm in presence of an intruder or under age user while avoiding false alarms when an authorized person is using the body of water;
      the self-learning capabilities also provide the robot with an ability to navigate through the body of water without impacting any persons or the objects;
   the self-learning capabilities also provide the robot with an ability to closely track the persons in the body of water at an increasing level of accuracy.

18. The method of claim 15, further comprising:
   wherein boundaries between areas of interest are defined;
   one boundary is an area in vicinity of the pool;
   another boundary is for the pool area itself;
   additional areas of interest may be defined by a user;
   the camera unit acquires an image of the objects in a field of view of the camera unit that includes individuals in a swimming pool;
   the camera unit produces an image which includes an entire head and shoulders of each individual;

the image of the object is adaptively clipped to include just an immediate area of a face of the individual to yield a clip which is a same size as a reference image;
this clip image is then transferred to an automated face locator which performs a function of registering position and orientation of the face in the image;
location of the face is determined in two phases:
first, the clip image is found by defining a bounding box, resulting in a bounding box based image;
second, location of eyes of the individual is determined;
once the location of the eyes is determined, the face is rotated about an axis located at a midpoint (gaze point) between the eyes to achieve a precise vertical alignment of the eyes;
this results in the automated face locator having a relatively precise alignment of a test image with the reference image;
then the automated face locator will be used to locate the face in the test image;
the clip image defined by the bounding box will not include hair.

19. The method of claim 15, further comprising:
an automated face verifier receives a clipped and registered reference image and a test image and makes a determination of whether the persons depicted in the reference image and test image are the same or are different;
this determination is made using a neural network which has been previously trained on numerous faces to make this determination;
once trained, the automated face verifier is able to make the determination without having actually been exposed to a face of an individual whose face is being verified;
wherein the test image and the reference image are acquired;
these images are then both processed by a clip processor which defines a bounding box containing predetermined portions of each face;
the reference image may be stored in various ways;
vi) either an entire image of the previous facial image may be recorded;
vii) or only a previously derived clip may be stored;
viii) or a clip that is compressed in a compression method for storage may be stored which is then decompressed from storage for use;
ix) or some other parameterization of the clip may be stored and accessed later to reduce an amount of storage capacity required;
x) or the reference image may be stored in a database;
then the reference and test images are clipped, this occurs in two stages:
first, a coarse location of a silhouette of a face is found;
next, a first neural network is used to find a precise bounding box;
a region of this bounding box is defined vertically to be from just below a chin to just above a natural hair line, or implied natural hair line if the person is bald;
a horizontal region of the face in this clipping region is defined to be between a beginning of ears at a back of a cheek on both sides of the face;
if one ear is not visible because the face is turned at an angle, a clipping region is defined to be an edge of the cheek or nose, whichever is more extreme;
this process performed by the clip processor;
next, a second neural network is used to locate eyes;
a resulting image of the eyes is then rotated about a gaze point;
the above steps are repeated for both the reference and the test images;
the test image and reference image are then registered using a position of the eyes as reference points.

20. The method of claim 19, further comprising:
wherein the robot acts as a game platform such that the camera unit overlooking a bottom of the pool and the robot together facilitate augmented reality games;
wherein a user of those games is not in the pool, but instead is using a mobile device outside the pool;
wherein the augmented reality game on the mobile device constantly receives and sends data to the cloud, the robot constantly sends and receives data to the cloud, and the camera unit mounted inside the pool overlooking the bottom of the pool constantly sends and receives data to the cloud, such that the augmented reality game involves creatures and locations throughout the pool that are not physically present, but are visible to the user on the mobile device;
wherein the data the robot sends to the cloud is based on the localization sensors and software of the robot, and this data is used as part of the augmented reality game to display the creatures and other aspects of the augmented reality game.

* * * * *